US012613400B2

(12) United States Patent
Thews et al.

(10) Patent No.: US 12,613,400 B2
(45) Date of Patent: Apr. 28, 2026

(54) SEALED FLUORESCENCE MICROSCOPE WITH CONSTANT BEAM PATH

(71) Applicant: Revvity Cellular Technologies GmbH, Hamburg (DE)

(72) Inventors: Elmar Thews, Hamburg (DE); Roland Stange, Hamburg (DE)

(73) Assignee: Revvity Cellular Technologies GmbH, Hamburg (DE)

( * ) Notice: Subject to any disclaimer, the term of this patent is extended or adjusted under 35 U.S.C. 154(b) by 328 days.

(21) Appl. No.: 18/500,859

(22) Filed: Nov. 2, 2023

(65) Prior Publication Data

US 2025/0147295 A1 May 8, 2025

(51) Int. Cl.
G02B 21/00 (2006.01)
G02B 21/04 (2006.01)
(Continued)

(52) U.S. Cl.
CPC ......... *G02B 21/0076* (2013.01); *G02B 21/04* (2013.01); *G02B 21/26* (2013.01); *G02B 21/365* (2013.01)

(58) Field of Classification Search
CPC ......... A61B 5/0071; A61B 3/102; A61B 3/12; A61B 3/10; A61B 5/0059; A61B 5/14556; A61B 6/485
See application file for complete search history.

(56) References Cited

U.S. PATENT DOCUMENTS 5,959,098 A * 9/1999 Goldberg ............. B01J 19/0046
530/335
7,466,408 B2 * 12/2008 Tanaami ............ G01N 21/6452
356/417
(Continued)

FOREIGN PATENT DOCUMENTS

CN      104862226 A    8/2015
DE    102005033927 A1  6/2007
EP       1553166 A1    7/2005

OTHER PUBLICATIONS

Cytena, "Cellcyte X(TM) Harness the power of live cell imaging", retrieved from https://www.cytena.com/wp-content/uploads/2022/02/CELLCYTEX-brochure-211001.pdf, 2022, 12 pp.
(Continued)

*Primary Examiner* — Mustak Choudhury
(74) *Attorney, Agent, or Firm* — Myers Bigel, P.A.

(57) ABSTRACT

A fluorescence microscope includes a housing having an upper wall with an opening. A glass stage overlies the opening and is configured to seal the interior of the housing from an outside environment. The glass stage includes an array of windows, and each window is configured to receive a respective specimen plate. A camera, a light source, and an optical assembly are provided within the housing. The light source is configured to generate an illumination beam, and the optical assembly is movable so as to provide an optical path for the illumination beam from the light source onto a specimen positioned at each window in the array, and to provide an optical path for a fluorescence emission beam from each specimen to the camera. The optical assembly is configured such that the optical path length of the fluorescence emission beam from each specimen to the camera is the same.

21 Claims, 9 Drawing Sheets

(51) Int. Cl.
G02B 21/26 (2006.01)
G02B 21/36 (2006.01)

(56) References Cited

U.S. PATENT DOCUMENTS

| | | | |
|---|---|---|---|
| 7,718,423 B2 | 5/2010 | Tsuchiya | |
| 2004/0156109 A1* | 8/2004 | Hoover ................. | G02B 21/08 359/368 |
| 2005/0051723 A1 | 3/2005 | Neagle et al. | |
| 2005/0105172 A1* | 5/2005 | Hasegawa .............. | C12M 23/50 359/368 |
| 2010/0227780 A1* | 9/2010 | Cerrina ................ | B01J 19/0046 506/32 |
| 2019/0227291 A1* | 7/2019 | Stokes ................. | G02B 21/361 |

OTHER PUBLICATIONS

Sartorius , "Empower Your Research with Incucyte(R) Live-Cell Analysis", retrieved from https://www.sartorius.com/en/products/live-cell-imaging-analysis/live-cell-analysis-instruments, before Apr. 4, 2022, 19 pp.
"International Search Report and Written Opinion of the International Searching Authority", PCT International Application No. PCT/EP2024/078448, Dec. 17, 2024, 13 pp.

* cited by examiner

SEALED FLUORESCENCE MICROSCOPE WITH CONSTANT BEAM PATH

FIELD

The present inventive concept relates generally to microscopes and, more particularly, to fluorescence microscopes.

BACKGROUND

Microscopes in an incubator environment may become contaminated due to conditions in the incubator. For example, a microscope within an incubator environment may become mouldy, may gather germs or bacteria, and/or may have fungus growing on it. Additionally, conventional incubator microscopes are generally automated inverted microscopes, which can be bulky due to the size of the specimen scan table.

SUMMARY

According to some embodiments of the present inventive concept, a fluorescence microscope includes a housing having an upper wall with an opening. A glass stage overlies the opening and is configured to seal the interior of the housing from an outside environment, such as an incubator environment. The glass stage includes an array of windows, wherein each window is configured to receive a respective specimen plate. A camera, a light source, and an optical assembly are provided within the housing and are protected by the housing from the outside environment. The light source is configured to generate an illumination beam, and the optical assembly is movable so as to provide an optical path for the illumination beam from the light source onto a specimen positioned at each window in the array, and to provide an optical path for a fluorescence emission beam from each specimen to the camera. The optical assembly is configured such that the length of an optical path of the fluorescence emission beam from each specimen to the camera is substantially the same.

In some embodiments, the optical assembly includes a base secured to a lower wall of the housing, a first arm movably secured to the base, and a second arm movably secured to the first arm. However, it is understood that embodiments of the present inventive concept are not limited to the optical assembly having only two arms. The optical assembly may have any number of arms more than two. For example, the upper or second arm could be split into two arms with two more mirrors without changing the functionality of the optical assembly, only increasing the height of the instrument. The first arm is configured to rotate about a first axis, and the second arm is configured to rotate about a second axis that is spaced apart from, and substantially parallel to, the first axis. The first arm and the second arm each include the optical components that produce the optical path for the fluorescence emission beam from each specimen to the camera. The second arm includes an objective, a beam splitter, and a first mirror. The beam splitter is configured to direct the illumination beam from the light source through the objective and onto a respective specimen, and to direct the fluorescence emission beam from the respective specimen received by the objective through the second arm to the first mirror. The first mirror is configured to direct the fluorescence emission beam into the first arm. The first arm includes a second mirror and a third mirror. The second mirror is configured to direct the fluorescence emission beam from the first mirror to the third mirror, and the third mirror is configured to direct the fluorescence emission beam into the camera. In some embodiments, a first optical filter is located between the beam splitter and the first mirror, and a second optical filter is located between the third mirror and the camera.

In some embodiments, the second arm further includes a focusing mechanism configured to focus the fluorescence emission beam received by the objective from each specimen. In some embodiments, the light source is supported by the second arm.

A drive system is configured to move the objective within an X-Y plane beneath the glass stage. A controller is coupled to the drive system and is configured to control the drive system to selectively position the objective beneath each window in the array. In some embodiments, the drive system includes a first drive assembly configured to move the objective along an X direction within the plane, and a second drive assembly configured to move the objective along a Y direction within the plane. The controller is coupled to the light source and is configured to control operation of the light source.

The camera is located within the base and is configured to generate a fluorescence image of each specimen from the respective fluorescence emission beam received from each specimen.

In some embodiments, the glass stage is movably secured to the housing and is movable between an open position and a closed position. In some embodiments, the glass stage includes tempered glass, such as, for example, Gorilla® glass.

In some embodiments, the light source includes at least one solid state light source.

Embodiments of the present invention are advantageous over conventional microscopes utilized in an incubator environment because the optical assembly and other components of the microscope are sealed from the incubator environment and are not exposed to germs, fungus, bacteria, moisture, etc., within the incubator environment. In addition, the microscope of the present invention uses an objective lens that scans below a specimen and has a much smaller footprint than conventional incubator microscopes. Furthermore, the glass stage remains stationary, which is good for instances where specimen plates being imaged do not have cell adherence.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present inventive concept.

In FIG. 2A, the glass stage upon which samples are to be placed for scanning and imaging is in an open position. In FIG. 2B, the glass stage is in the closed position, whereby the interior of the housing is sealed from the outside environment.

DETAILED DESCRIPTION

Figure 1:
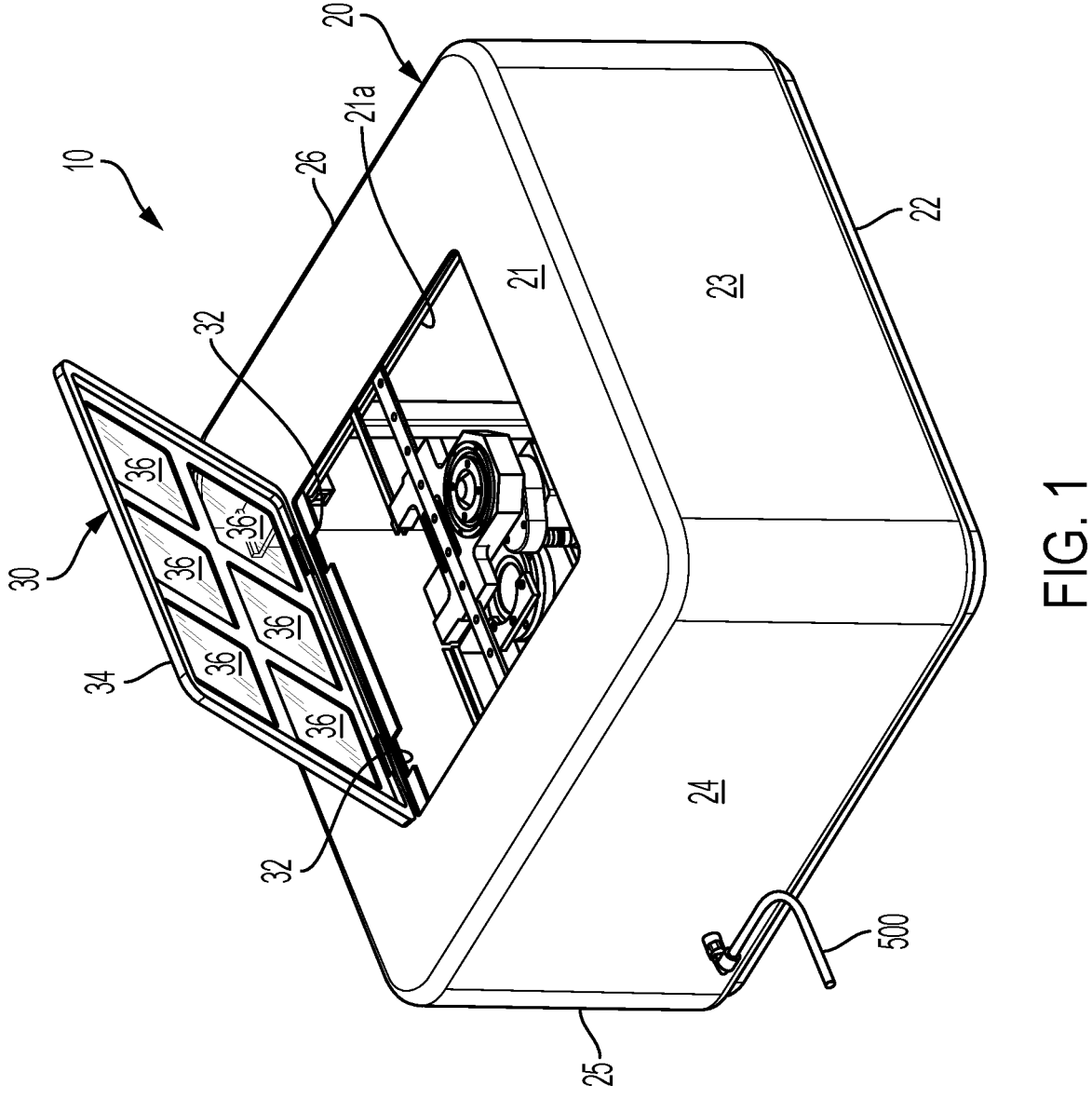
FIG. 1 is a top perspective view of a fluorescence microscope, according to some embodiments of the present inventive concept.
Figure 2A:
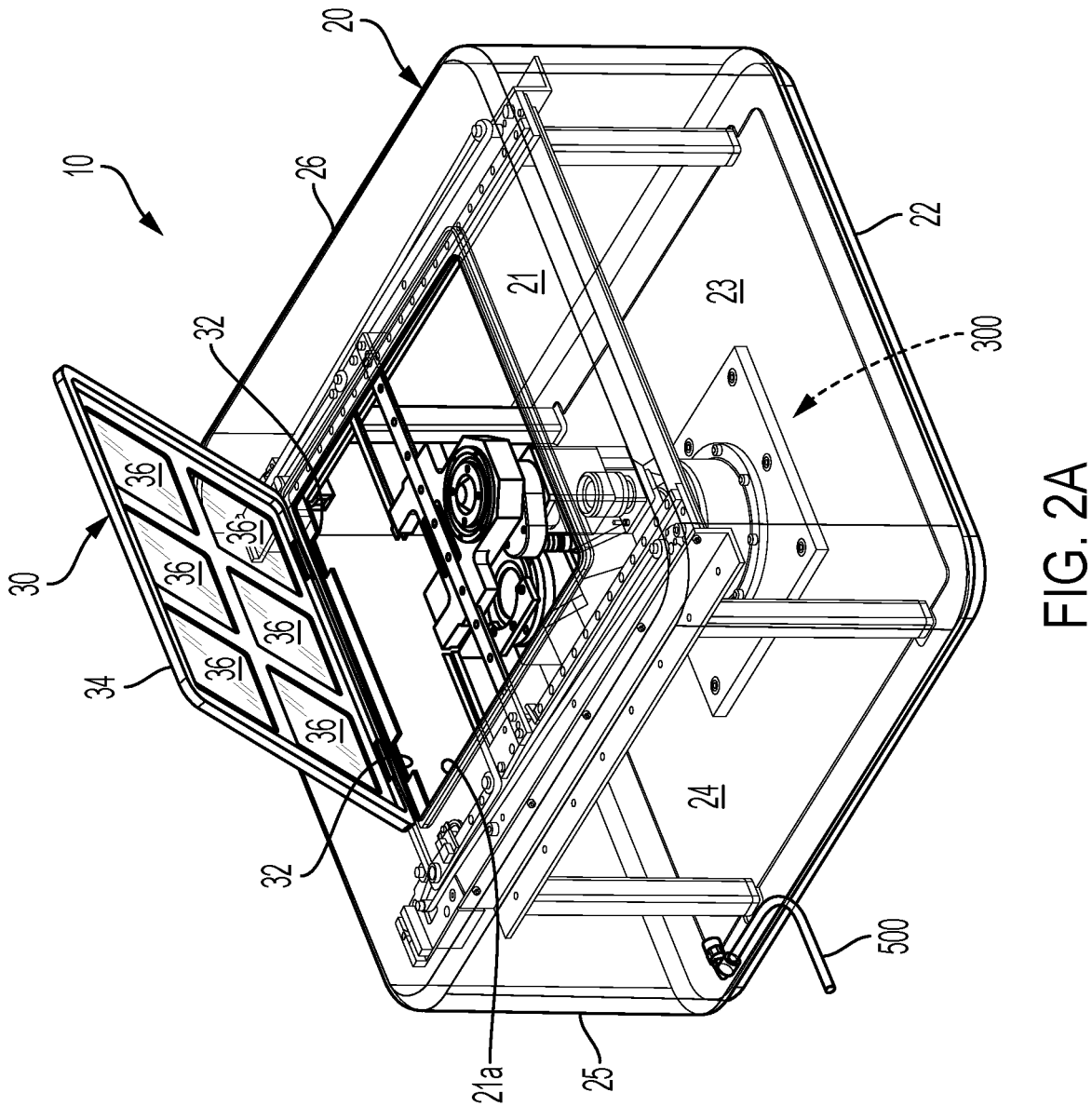
FIGS. 2A and 2B illustrate the microscope of FIG. 1 with the housing transparent such that the optical assembly and other microscope components within the housing can be seen.
Figure 2B:
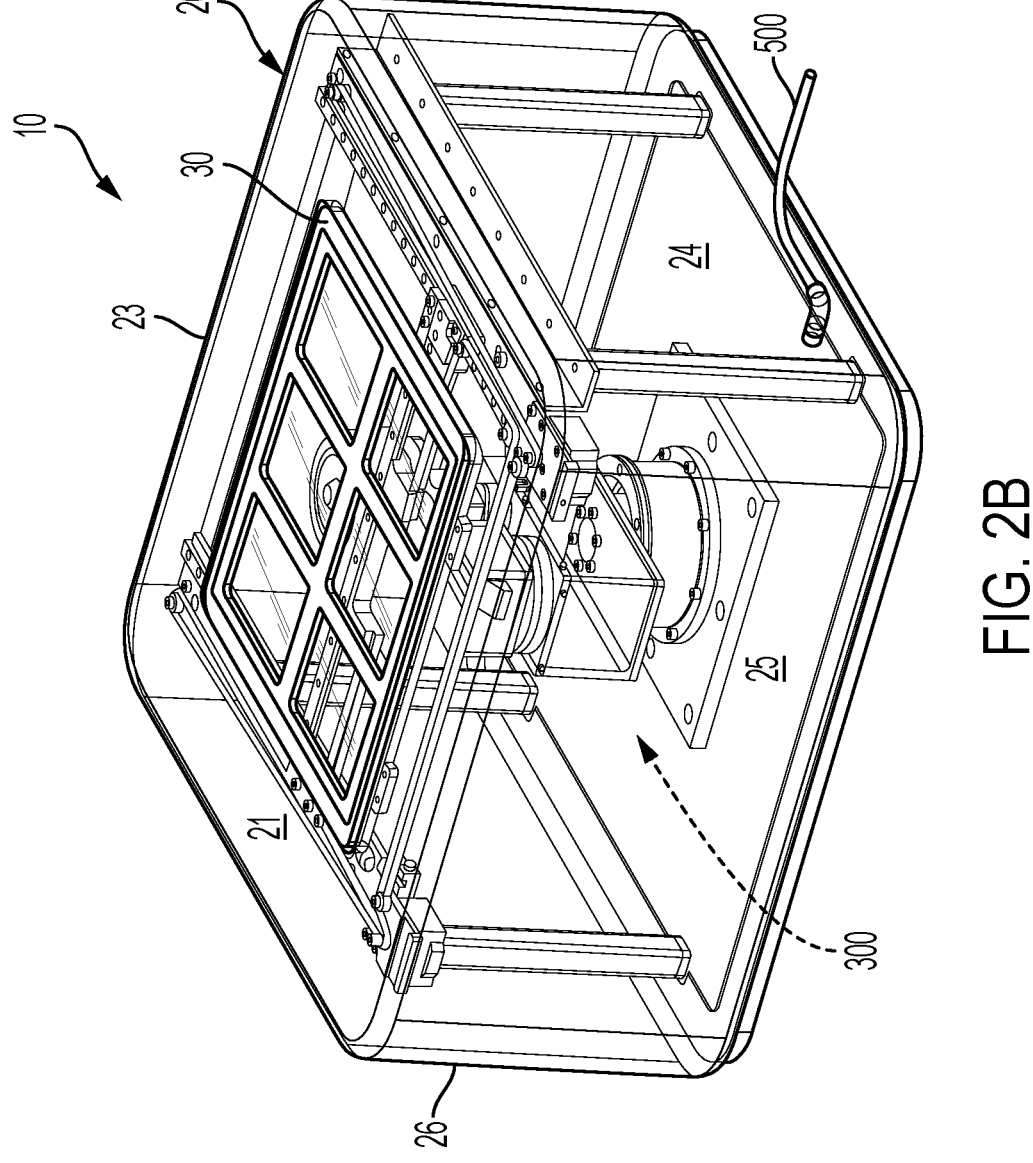

Referring initially to FIGS. 1 and 2A-2B, a fluorescence microscope 10 for use within an incubator environment, according to embodiments of the present inventive concept, is illustrated. The microscope 10 includes a housing 20 having a generally cube shape with upper and lower walls 21, 22 and side walls 23, 24, 25, 26. The upper wall 21 includes an opening 21a through which the optical assembly and other components of the microscope 10 are visible. A glass stage 30 is movably secured to the housing 20 via a pair of hinges 32 and is movable between an open position (FIGS. 1 and 2A) and a closed position (FIG. 2B). When in the closed position, the glass stage 30 overlies the opening 21a in the housing upper wall 21 and seals the interior of the housing 20 from an outside environment, such as an incubator environment. The housing 20 may be formed from various materials including, but not limited to, metals, e.g., stainless steel, and polymers, as well as combinations thereof. One of ordinary skill in the art will recognize that any number of suitable materials may be used as long as they can withstand the environment within the incubator. For example, incubators are commonly kept at a temperature of around 37° C. for human cells, though other higher or lower temperatures may be utilized for any number of specimens. Additionally, the atmosphere within the incubator is frequently humidified and $CO_2$ enriched, for example, to keep living cells from drying out. In some incubators, oxygen is limited in the atmosphere. Thus, any materials that will not adversely be affected by such an environment may be used to form the housing 20 of the microscope 10. Moreover, the housing 20 may have various shapes and configurations and is not limited to the illustrated shape. In at least some embodiments, the housing 20 is a substantially rectangular or square box, though those skilled in the art will recognize any number of shapes may be suitable. The microscope 10 may be utilized in any incubator, provided the incubator can physically accommodate the size of the microscope 10. The two-arm configuration of the fluorescence microscope 10, as described below, is advantageous in that it enables the fluorescence microscope 10 to be small enough to fit in standard incubators.

The illustrated glass stage 30 includes a frame 34 supporting an array of windows 36. In at least some embodiments, the frame 34 is comprised of stainless steel. The frame 34 may be formed from various materials including, but not limited to, metals and polymers, as well as combinations thereof. Each window 36 is sized and configured to receive a respective specimen plate, as would be understood by one of skill in the art. In the illustrated embodiment, the glass stage includes six windows 36. However, the glass stage 30 may include various numbers of windows 36, including more than six windows and fewer than six windows, and embodiments of the present inventive concept are not limited to the illustrated number and arrangement of windows 36. In some embodiments, the windows 36 of the glass stage 30 are formed from tempered glass, such as, for example, Gorilla® glass (available from Corning, Inc., Corning, New York), In some embodiments, the windows 36 of the glass stage 30 are formed from Dragontail™ glass (available from Asahi Glass Co., Tokyo, Japan) or Xensation® glass (available from Schott AG, Mainz, Germany).

Figure 3:
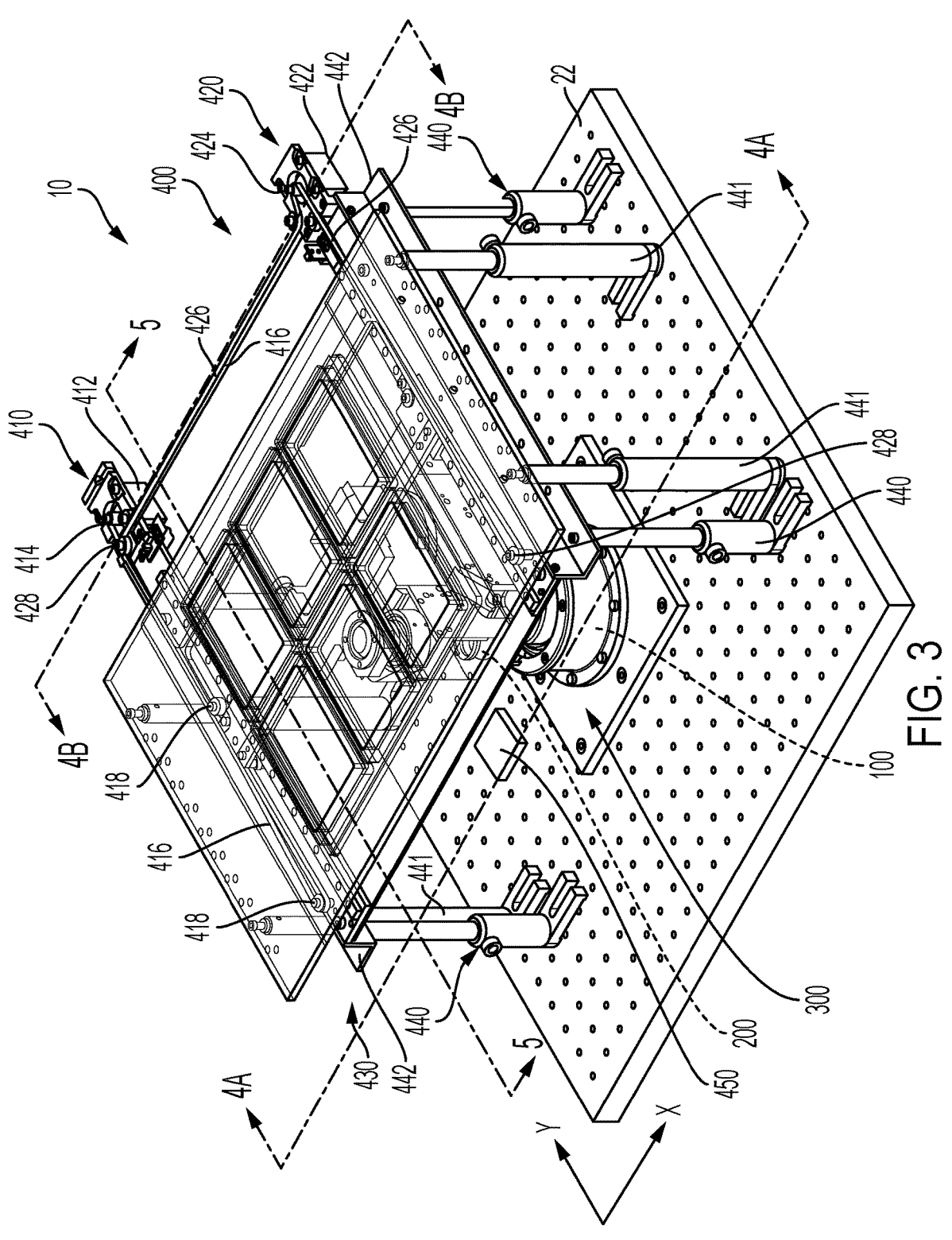
FIG. 3 is a perspective view of the microscope of FIG. 1 with the housing removed for clarity.
Figure 4A:
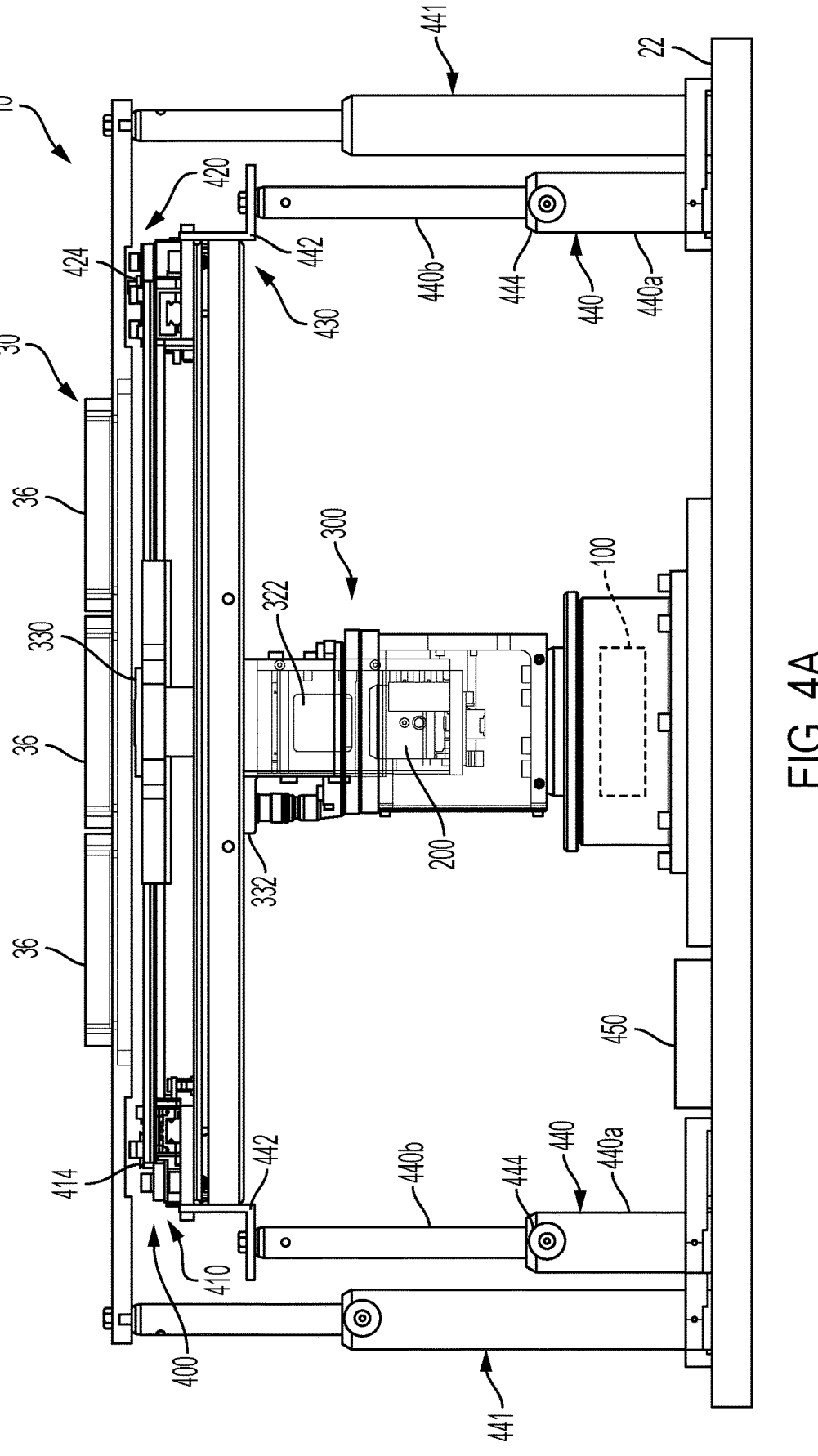
FIG. 4A is a side view of the microscope of FIG. 3 taken along line 4A-4A.
Figure 4B:
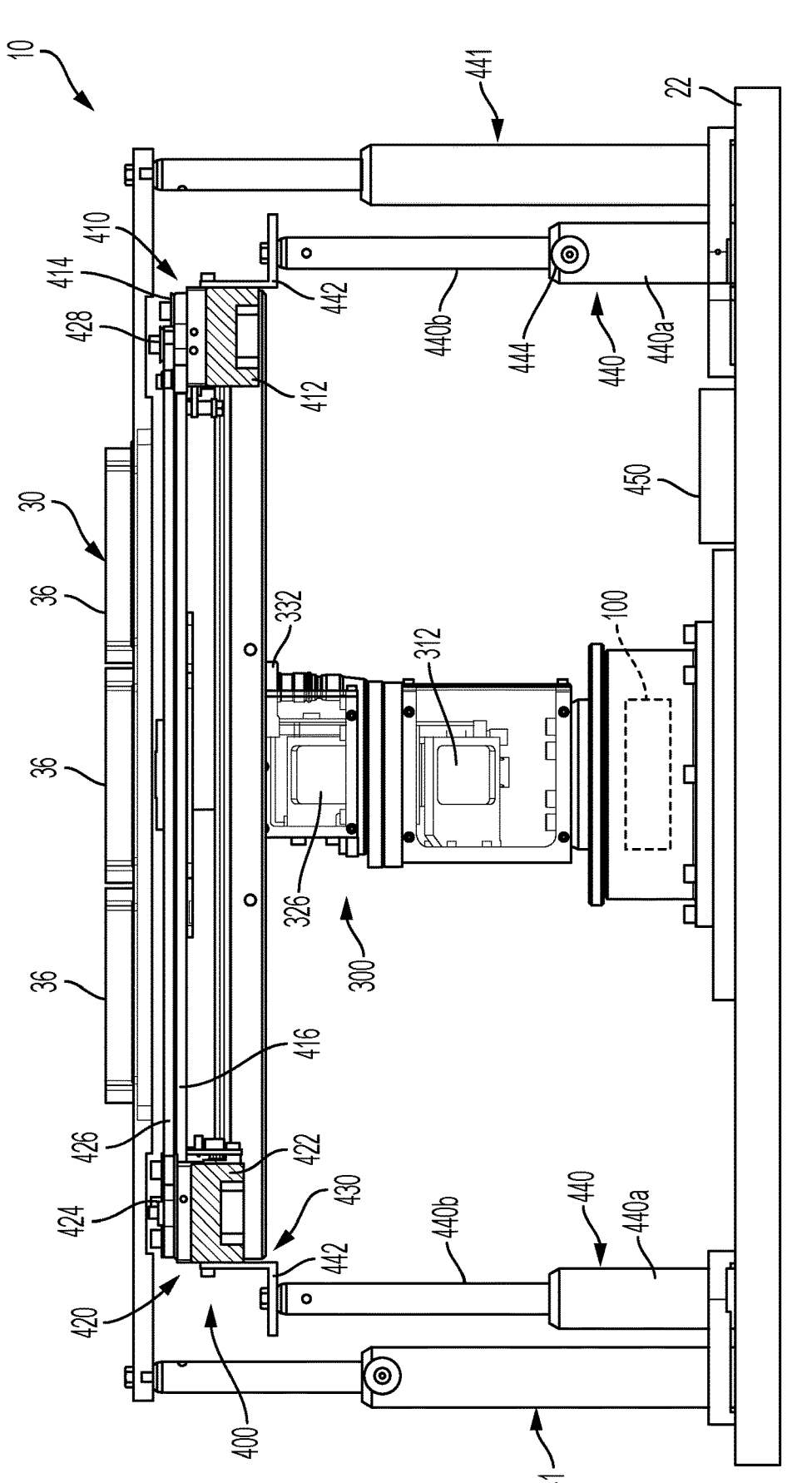
FIG. 4B is a side view of the microscope of FIG. 3 taken along line 4B-4B.

Referring to FIGS. 3 and 4A-4B, the various components of the microscope 10 located within the housing 20 are illustrated, and with the housing 20 removed for clarity. These components include a camera 100, a light source 200, an optical assembly 300, and a drive system 400. The optical assembly 300 is movable, as will be described below, so as to provide an optical path for the illumination beam from the light source 200 onto a specimen positioned at each window 36 of the glass stage 30, and to provide an optical path for a fluorescence emission beam from each specimen to the camera 100. The optical assembly 300 is configured such that the length of an optical path of the fluorescence emission beam from each specimen to the camera 100 is substantially the same. As such, no matter which window 36 the objective 330 is positioned beneath, an optical path for a fluorescence emission beam from a specimen will have the same length. In some embodiments, the objective 330 may comprise a 1.25× to 40× lens, though those skilled in the art will recognize that any objective strength may be used dependent on the working distance and the specimens to be viewed and/or imaged.

Figure 5A:
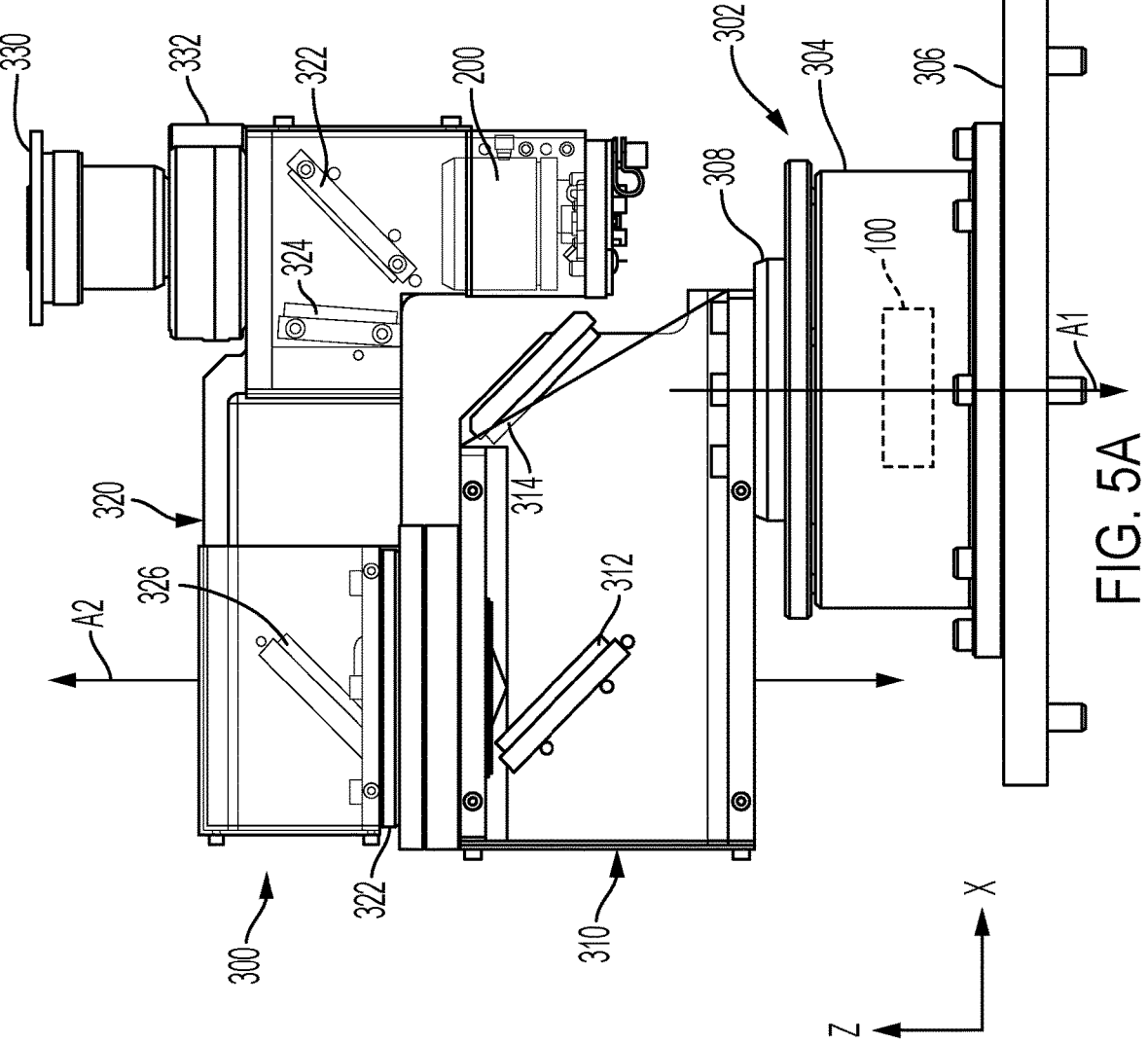
FIGS. 5A and 5B are side views of the optical assembly of the microscope of FIG. 3 taken along line 5-5 and with other components of the microscope not illustrated for clarity.
Figure 5B:
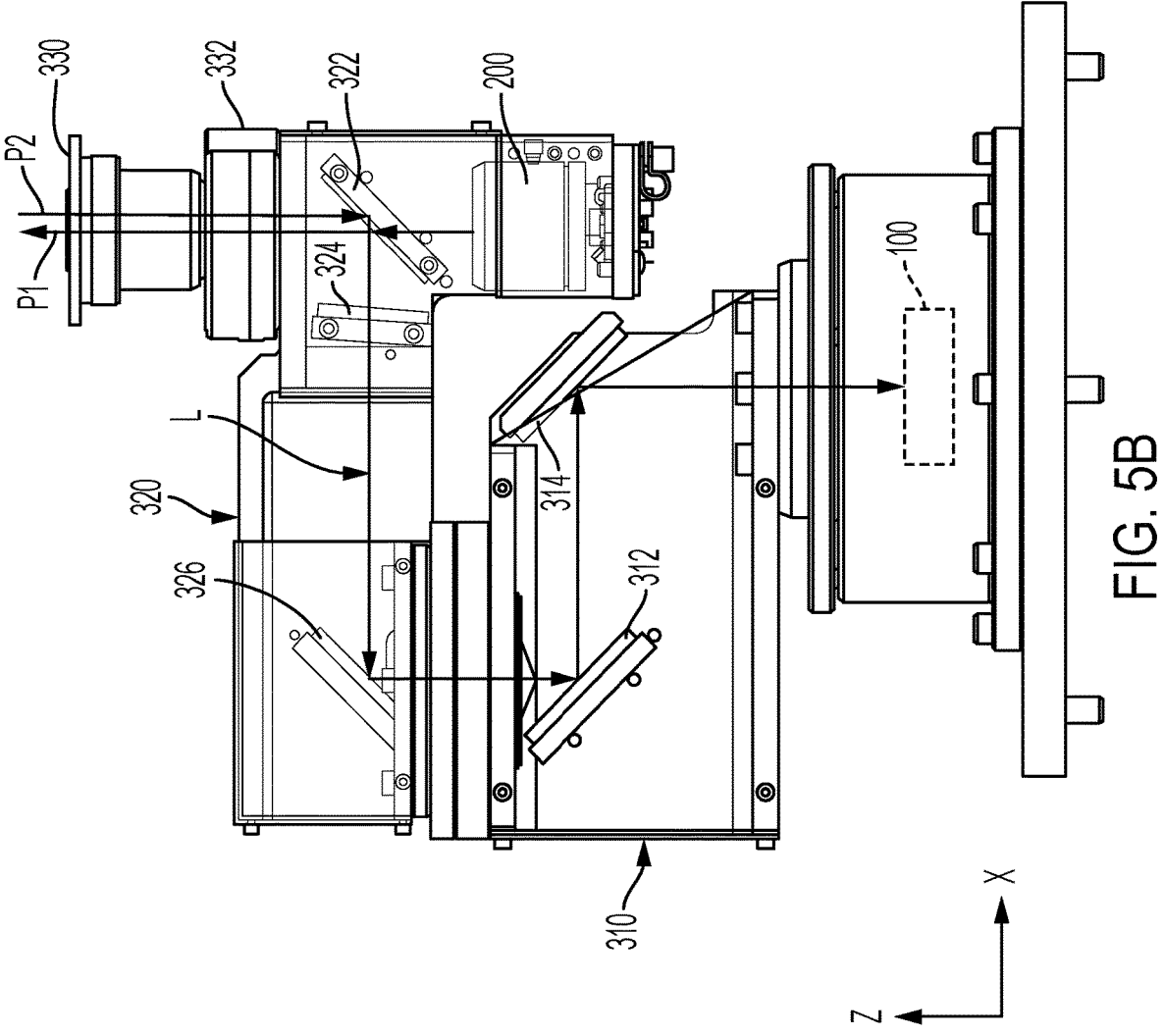

Referring to FIGS. 5A-5B, the optical assembly 300 is illustrated with the other components of the microscope 10 removed for clarity. The optical assembly 300 includes a base 302 that is secured to the lower wall 22 of the housing 20. In the illustrated embodiment, the base 302 includes a generally cylindrical housing 304 that contains the camera 100 therewithin. A lower portion of the base housing 304 is secured to a plate 306 which is secured to the lower wall 22 of the housing 20. The optical assembly 300 includes a first arm 310 that is movably secured to an upper portion of the base housing 304 via a bearing 308 and is rotatable about a first axis A1 via the bearing 308. The bearing 308 is annular in shape with a central opening that permits the optical path for the fluorescence emission beam from each specimen to reach the camera 100 located within the base housing 304.

The optical assembly 300 also includes a second arm 320 that is movably secured to the first arm 310 via a bearing 322 and is rotatable about a second axis A2 that is spaced apart from, and substantially parallel to, the first axis A1, as illustrated. The bearing 322 is annular in shape with a central opening that permits the optical path for the fluorescence emission beam from each specimen to pass from the second arm 320 into the first arm 310.

The first arm 310 and the second arm 320 each include the optical components that produce the optical path for the fluorescence emission beam from each specimen to the camera 100. In the illustrated embodiment, the second arm 320 includes an objective 330 that is configured to move within a plane beneath the glass stage 30 as the first and second arms 310, 320 are rotated about their respective axes A1, A2. The second arm 320 also includes the light source 200 for illuminating samples supported by the glass stage 30. In some embodiments, the light source includes at least one solid state light source, e.g., a light emitting diode (LED) or semiconductor laser. Light from the light source 200 passes through the objective 330 and onto a specimen located at a respective window 36 above the objective 330. A fluorescence emission beam from the sample then passes back through the objective 330, through the first and second arms 310, 320 and into the camera 100. The camera 100 is configured to generate a fluorescence image of each specimen from the respective fluorescence emission beam received from each specimen, as would be understood by one of skill in the art. The camera 100 may be, for example, a charge coupled device (CCD) camera, a complementary metal oxide semiconductor (CMOS) camera, or a scientific CMOS (sCMOS) camera.

In the illustrated embodiment, the second arm 320 includes a focusing mechanism 332 configured to focus the fluorescence emission beam received by the objective 330 from each specimen. The focusing mechanism 332 may be a deformable lens capable of adjusting the focal point in the Z direction (i.e., a direction perpendicular to the X-Y plane). In some embodiments, the deformable lens may be water or gel based. In some embodiments, the deformable lens may be manipulated or deformed through an electric field, piezo-deformation, or a circular actuator.

Figure 6:
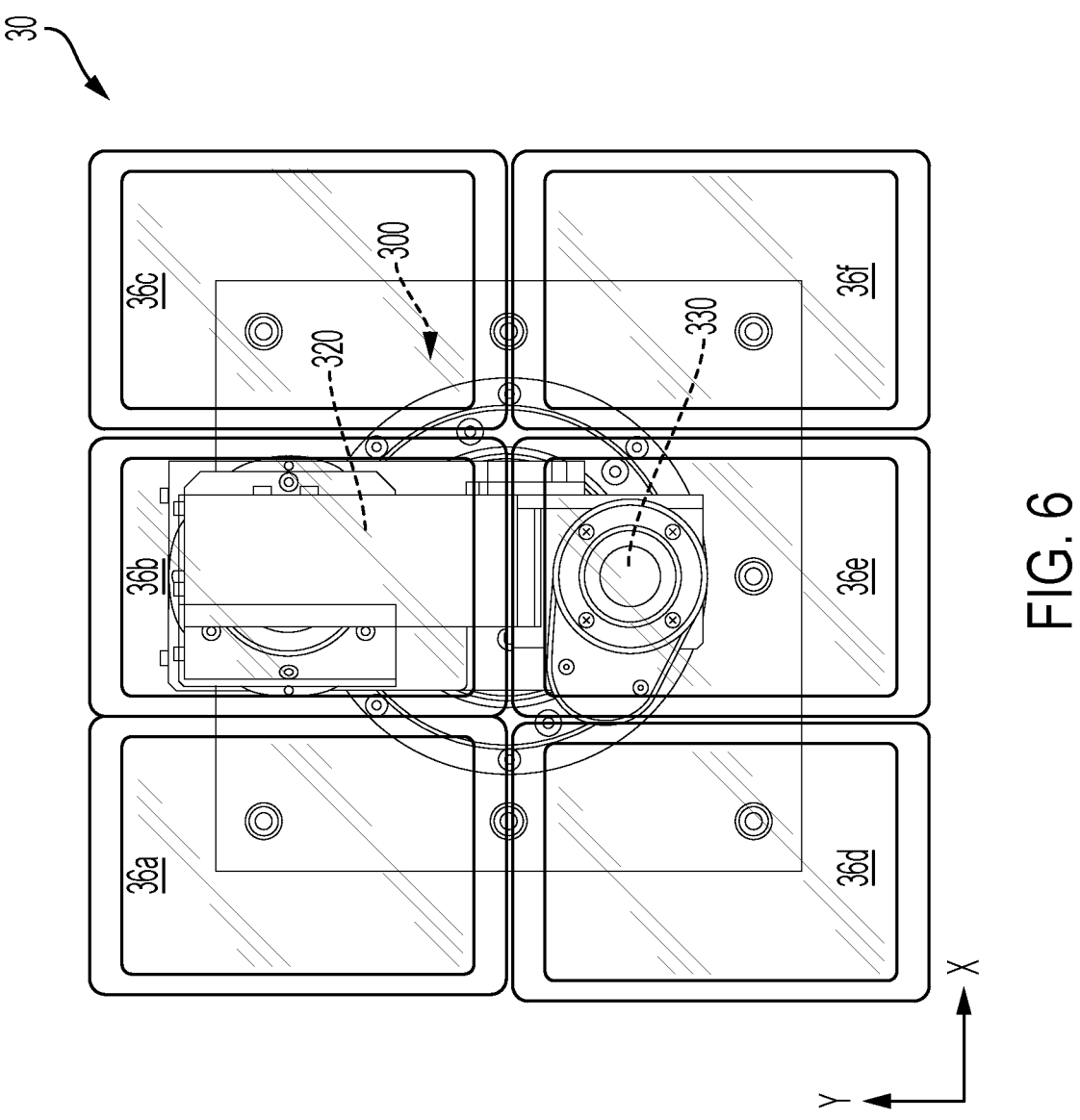
FIG. 6 is a top plan view of the glass stage with the optical assembly therebeneath. Other components of the microscope are not illustrated for clarity.

The drive system 400 is configured to move the objective within an X-Y plane beneath the glass stage 30. In particular, the drive system 400 is configured to move the first and second arms 310, 320 of the optical assembly 300 such that the objective 330 can scan back and forth within the X-Y plane beneath each window 36 in the array. Referring to FIG. 6, the array of windows 36 is illustrated with the optical assembly 300 positioned therebeneath. The drive system 400 is configured to move the optical assembly (i.e., cause the first and second arms 310, 320 to rotate about their respect axes A1, A2) such that the objective 330 can be positioned at each window 36 in the array and can scan back and forth within the X-Y plane beneath each respective window 36 acquiring images of a sample in the respective window before moving to another window. For example, the objective may be positioned initially beneath the window 36a in the upper left portion of the array and then moved back and forth to scan the entire or other predefined area of the window 36a so as to acquire images of a sample positioned on the window 36a. The objective can then be moved to adjacent window 36b and the same scanning operation performed to acquire images of a sample on window 36b. This continues until all windows 36a-36f (or at least all windows having samples placed on top thereof) and the samples supported thereby have been imaged.

Referring back to FIG. 3, the illustrated drive system 400 includes a first drive assembly 410 configured to move the objective 330 along an X direction within the X-Y plane, and a second drive assembly 420 configured to move the objective along a Y direction within the X-Y plane. The first drive assembly includes a drive motor 412 with an output shaft coupled to a drive pulley 414. A drive belt 416 is driven by the drive pulley 414 to move the objective 330 along the X direction within the X-Y plane. The drive belt 416 is looped around a series of pulleys 418, as would be understood by one of skill in the art. Similarly, the second drive assembly 420 includes a drive motor 422 with an output shaft coupled to a drive pulley 424. A drive belt 426 is driven by the drive pulley 424 to move the objective 330 along the Y direction within the X-Y plane. The drive belt 426 is looped around a series of pulleys 428, as would be understood by one of skill in the art. The drive motors 412, 422 are operated by one or more controllers 450 (FIGS. 3 and 4A-4B). The one or more controllers 450 can be located anywhere in the open space of the instrument, without limitation. In some embodiments, the one or more controllers 450 may be located external to the housing 20. Power to the drive motors 412, 422, as well as to the light source 200 and camera 100 is provided from an electric power source via power cable 500.

Embodiments of the present inventive concept are not limited to the illustrated drive system 400. For example, in other embodiments, the drive system 400 could utilize anything from voice coil, linear motors, stepper motor per axis or an in core X-Y system to move the first and second arms 310, 320 so that the objective 330 is selectively positioned under the glass stage 30.

In the illustrated embodiment, the drive system 400 is supported within the housing 20 by a frame 430. The illustrated frame 430 includes four adjustable vertical supports 440 that support a pair of elongate members 442. The elongate members 442 support the drive motors 412, 422, and the various pulleys 418, 428 around which the respective drive belts 416, 426 are engaged. The illustrated vertical supports 440 each have a lower portion 440a and an upper portion 440b that is telescopically movable relative to the lower portion 440a such that the height of the elongate members 442 supporting the drive system 400 can be adjusted relative to the lower wall 21 of the housing 20. A locking mechanism 444 is provided with each support 440 to maintain the upper portion 440b at a desired height. Also, in the illustrated embodiment, four adjustable vertical supports 441 hold the top plate with the openings for the MTPs and the glass sealing plates. In other embodiments, the height difference may be fixed and the vertical supports 440, 441 may be replaced with a fixed height support system.

Referring back to FIGS. 5A-5B, in addition to the supporting the objective 330, the second arm 320 includes a beam splitter 322 and a first mirror 326. The beam splitter 322 is configured to allow the illumination beam from the light source 200 to pass therethrough to the objective 330 and onto a specimen at a respective window 36 of the glass stage 30. The beam splitter 322 is further configured to direct the fluorescence emission beam from the respective specimen received by the objective 330 through the first arm 310 to the first mirror 326. In at least some embodiments, the beam splitter 322 is a dielectric coated glass and/or quartz substrate. In some embodiments, the beam splitter 322 may be a 50/50 splitter, though those skilled in the art will recognize the benefits of using a beam splitter with a dielectric coated glass/quartz substrate, including improved transmission and reflection.

The first arm 310 includes a second mirror 312 and a third mirror 314. The second mirror 312 is configured to direct the fluorescence emission beam from the first mirror 326 to the third mirror 314. The third mirror 314 is configured to direct the fluorescence emission beam into the camera 100. In some embodiments, an optical filter 324 is located between the beam splitter 322 and the first mirror 326. In some embodiments, an optical filter may be located between the third mirror 314 and the camera 100 to limit the detection to the desired spectrum of the sample. Embodiments of the present concept can also be used to detect specimens in transmission light mode. The optical filter would, in this case, transmit the transmission light source and block surrounding ambient light. In fluorescence light mode the filters are positioned ideally in pupil conjugant planes, as dirt on them is not visible in the image later on. However, they can be inserted somewhere in the detection beam path after the beam splitter 322 to make the instrument work. Best background reduction is achieved right in front of the camera, most user friendly is in the filter block containing light source 200, beam splitter 322 and optical filter 324. In some embodiments, DeepLearning or artificial intelligence (AI) can be utilized to detect specimens. In some such embodiments, a planar transmission light source may be placed on top of the microtiter plates and activated (i.e., turned on) if the objective 320 is in place and the instrument 10 is ready for image acquisition. The transmission light images show no markers like the fluorescent contrast, but rather Deep-Learning algorithms may be used to train AI to detect cells or different compartments.

FIG. 5B illustrates the optical path P1 of light from the light source 200 through the objective 330 and onto a specimen at a respective window 36 of the glass stage 30. FIG. 5B also illustrates the optical path P2 of a fluorescence emission beam from a respective specimen to the camera 100. The length L of the optical path P2 is the sum of the following distances: the distance from a specimen being imaged to the beam splitter 322, the distance from the beam splitter 322 to the first mirror 326, the distance from the first mirror 326 to the second mirror 312, the distance from the second mirror 312 to the third mirror 314, and the distance from the third mirror 314 to the camera 100. Because of the movable configuration of the first and second arms 310, 320, no matter which window 36 that the objective 330 is positioned beneath, the length L of the optical path P2 will be substantially the same. The advantages of this two-arm construction is that it combines low weight, which means the optical assembly 300 can move the objective 330 very fast underneath the sample area, with stable optical performance due to always keeping the same optical path length. However, one skilled in the art will recognize that any number of arms may be suitable. For example, the first arm 310 or the second arm 320 may comprise one or more arms for the same purposes. In some embodiments, there is a first arm 310, a second arm 320, and a third arm (not illustrated) further comprising two additional mirrors for substantially the same purposes as those on the second arm 320. For good optical quality of modern objective lenses, the distance between the tube lens (between mirrors 326 and 312) and the camera 100 has to be fixed (otherwise the magnification changes). The distance from the back aperture of the objective 330 to the tube lens can vary a little as one skilled in the art would recognize (usually there is a focus drive in between), but if the variation is more than +/−15 mm or so image distortions and vignetting may appear.

The controller 450 controls all moving and data collecting parts of the microscope 10. An image-based auto focus algorithm will allow the controller 450 to switch on the light source and take an image, then change the focus plane with the tunable lens and take another picture, etc. An algorithm will then determine from the images the one in focus.

In some embodiments, the controller 450 may comprise a processor which may take the forms of a microprocessor and/or computer and suitable software for control of the microscope function as well as analysis of any samples and/or specimens being viewed and/or imaged by the microscope. In some embodiments, the processor can be present, e.g., in the controller 450 or as a stand-alone processor, to control and coordinate operation of the system for the various modes of operation using the system. For this purpose, the processor can be electrically coupled to each of the components of the system, e.g., the objective lenses, the scanning stage, the light sources, one or more cameras, one or more drive systems, etc. In some aspects, as one skilled in the art may recognize, the microscope 10 may comprise additional elements that may be controlled by the controller 450 and/or processor, for example, but not limited to, filter changers and barcode scanners to identify the current objective lens and excitation modules.

In certain configurations, the controller 450 may comprise one or more computer systems and/or common hardware having, for example, a microprocessor and/or suitable software for operating the system, e.g., to control the drive systems, drive motors, light source, camera(s), etc. In some examples, any one or more components of the system can include its own respective controller, processor, operating system and other features to permit operation of that component. The controller 450 can be integral to the systems or may be present on one or more accessory boards, printed circuit boards or computers electrically coupled to the components of the system. The controller 450 is typically electrically coupled to one or more memory units to receive data from the other components of the system and permit adjustment of the various system parameters as needed or desired. The processor may be part of a general-purpose computer such as those based on Unix, Intel PENTIUM-type processor, ARM processer, Motorola PowerPC, Sun UltraSPARC, Hewlett-Packard PA-RISC processors, or any other type of processor. One or more of any type of controller or computer system may be used according to various embodiments of the technology. Further, the system or controller 450 may be connected to a single computer or may be distributed among a plurality of computers attached by a communications network. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, calibrations and data during operation of the system in the various modes. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the system. The controller 450 and/or processor typically is electrically coupled to a power source which can, for example, be a direct current source, an alternating current source, a battery, a fuel cell or other power sources or combinations of power sources. The power source can be shared by the other components of the system. The system may also include one or more input devices, for example, a keyboard, mouse, trackball, microphone, touch screen, manual switch (e.g., override switch) and one or more output devices, for example, a printing device, display screen, speaker. In addition, the system may contain one or more communication interfaces that connect the computer system and/or controller 450 to a communication network (in addition or as an alternative to the interconnection device). The system may also include suitable circuitry to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth®, Wi-Fi®, Near Field Communication or other wireless protocols and/or interfaces.

In certain embodiments, the storage system used in the systems described herein typically includes a computer readable and writeable non-volatile recording medium in which codes can be stored that can be used by a program to be executed by the processor or information stored on or in the medium to be processed by the program. The medium may, for example, be a hard disk, solid state drive or flash memory. Typically, in operation, the processor causes data to be read from the non-volatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware. Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may be also implemented using specially programmed, special purpose hardware. A processor may be a commercially available processor such as the well-known Pentium class processors available from the Intel Corporation. Many other processors are also commercially available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer or other portable devices which can communicate through a wired or wireless interface and permit operation of the systems remotely as desired.

Embodiments of the present invention have been described above with reference to the accompanying drawings, in which embodiments of the invention are shown. This invention may, however, be embodied in many different forms and should not be construed as limited to the embodiments set forth herein. As may be recognized by those of ordinary skill in the pertinent art based on the teachings herein, numerous changes and modifications may be made to the above-described and other embodiments without departing from its scope as defined in the claims. Rather, these embodiments are provided so that this disclosure will be thorough and complete, and will fully convey the scope of the invention to those skilled in the art. For example, the components of the microscope 10, housing 20, frame 34, or stage 30 may be made of any of numerous different materials, that are currently known, or that later become known. For example, but not limited to, rather than taking the form of a glass stage having a frame defining a plurality of windows, the glass stage may be made of a suitable plastic or glass-alternative such as quartz, or the glass stage may otherwise comprise a single window for imaging one sample or specimen. Accordingly, this detailed description of embodiments is to be taken in an illustrative, as opposed to a limiting sense. Like numbers refer to like elements throughout.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A fluorescence microscope, comprising:
a housing comprising an upper wall with an opening;
a glass stage overlying the opening, wherein the glass stage seals an interior of the housing from an outside environment and comprises an array of windows, each window configured to receive a specimen plate;
a camera within the housing;
a light source within the housing, wherein the light source is configured to generate an illumination beam; and
an optical assembly within the housing, wherein the optical assembly is movable about a first axis and about a second axis that is spaced apart from, and substantially parallel to, the first axis so as to provide an optical path for the illumination beam from the light source onto a specimen positioned at each window in the array, and to provide an optical path for a fluorescence emission beam from each specimen to the camera, wherein a length of the optical path for the fluorescence emission beam from each specimen to the camera is substantially the same.

2. The fluorescence microscope of claim 1, wherein the optical assembly comprises:
a base secured to a lower wall of the housing;
a first arm movably secured to the base, wherein the first arm is configured to rotate about the first axis; and
a second arm movably secured to the first arm, wherein the second arm is configured to rotate about the second axis;
wherein the first arm and the second arm each comprise optical components that produce the optical path for the fluorescence emission beam from each specimen to the camera.

3. The fluorescence microscope of claim 2, wherein the light source is supported by the second arm.

4. The fluorescence microscope of claim 2, wherein the camera is located within the base and is configured to generate a fluorescence image of each specimen from the respective fluorescence emission beam received from each specimen.

5. The fluorescence microscope of claim 2, wherein the second arm comprises an objective, and further comprising a drive system configured to move the objective within a plane beneath the glass stage, and a controller coupled to the drive system, wherein the controller is configured to control the drive system to selectively position the objective beneath each window in the array.

6. The fluorescence microscope of claim 5, wherein the drive system comprises a first drive assembly configured to move the objective along an X direction within the plane, and a second drive assembly configured to move the objective along a Y direction within the plane.

7. The fluorescence microscope of claim 5, wherein the optical components of the second arm comprise a beam splitter and a first mirror, wherein the beam splitter is configured to direct the illumination beam from the light source through the objective and onto a respective specimen, and to direct the fluorescence emission beam from the respective specimen received by the objective to the first mirror, and wherein the first mirror is configured to direct the fluorescence emission beam into the first arm.

8. The fluorescence microscope of claim 7, wherein the optical components of the first arm comprise a second mirror and a third mirror, wherein the second mirror is configured to direct the fluorescence emission beam from the first mirror to the third mirror, and wherein the third mirror is configured to direct the fluorescence emission beam into the camera.

9. The fluorescence microscope of claim 8, further comprising a first optical filter located between the beam splitter and the first mirror, and a second optical filter located between the third mirror and the camera.

10. The fluorescence microscope of claim 5, wherein the second arm further comprises a focusing mechanism configured to focus the fluorescence emission beam received by the objective from each specimen.

11. The fluorescence microscope of claim 5, wherein the controller is coupled to the light source, and wherein the controller is further configured to control operation of the light source.

12. The fluorescence microscope of claim 1, wherein the glass stage is movably secured to the housing and is movable between an open position and a closed position.

13. The fluorescence microscope of claim 1, wherein the glass stage comprises tempered glass.

14. The fluorescence microscope of claim 13, wherein the tempered glass is Gorilla® glass.

15. The fluorescence microscope of claim 1, wherein the light source comprises at least one solid state light source.

16. A fluorescence microscope, comprising:
a housing comprising an upper wall with an opening;
a glass stage overlying the opening, wherein the glass stage seals an interior of the housing from an outside environment and comprises an array of windows, each window configured to receive a specimen plate;
a camera within the housing;
a light source within the housing, wherein the light source is configured to generate an illumination beam;
an optical assembly within the housing, wherein the optical assembly comprises an objective, and wherein the optical assembly is movable so as to provide an optical path for the illumination beam from the light source through the objective and onto a specimen positioned at each window in the array, and to provide an optical path for a fluorescence emission beam from each specimen through the objective and to the camera, wherein a length of the optical path for the fluorescence emission beam from each specimen to the camera is substantially the same; and
a drive system configured to move the objective within a plane beneath the glass stage, and to selectively position the objective beneath each window in the array.

17. The fluorescence microscope of claim 16, wherein the drive system comprises a first drive assembly configured to move the objective along an X direction within the plane, and a second drive assembly configured to move the objective along a Y direction within the plane.

18. The fluorescence microscope of claim 16, wherein the glass stage is movably secured to the housing and is movable between an open position and a closed position, and wherein the glass stage comprises Gorilla® glass.

19. A fluorescence microscope, comprising:
a housing comprising an upper wall with an opening;
a glass stage overlying the opening, wherein the glass stage seals an interior of the housing from an outside environment, wherein the glass stage comprises an array of windows, each window configured to receive a specimen plate;
a camera within the housing; and
an optical assembly within the housing, the optical assembly comprising:
a base secured to a lower wall of the housing;
a first arm movably secured to the base, wherein the first arm is configured to rotate about a first axis; and
a second arm movably secured to the first arm, wherein the second arm is configured to rotate about a second axis that is spaced apart from, and substantially parallel to, the first axis;
wherein the second arm comprises an objective, a light source configured to generate an illumination beam, a beam splitter, and a first mirror, wherein the beam splitter is configured to direct the illumination beam from the light source through the objective and onto a specimen positioned at a respective window, and to direct a fluorescence emission beam from the specimen received by the objective to the first mirror, and wherein the first mirror is configured to direct the fluorescence emission beam into the first arm;
wherein the first arm comprises a second mirror, and a third mirror, wherein the second mirror is configured to direct the fluorescence emission beam from the first mirror to the third mirror, and wherein the third mirror is configured to direct the fluorescence emission beam into the camera;
wherein the first and second arms are movable such that a length of the optical path for the fluorescence emission beam from each specimen to the camera is substantially the same.

20. The fluorescence microscope of claim 19, further comprising a drive system configured to move the objective within a plane beneath the glass stage, and to selectively position the objective beneath each window in the array, wherein the drive system comprises a first drive assembly configured to move the objective along an X direction within the plane, and a second drive assembly configured to move the objective along a Y direction within the plane.

21. The fluorescence microscope of claim 19, wherein the glass stage comprises tempered glass.

* * * * *